United States Patent [19]

Kawai

[11] Patent Number: 4,825,831

[45] Date of Patent: May 2, 1989

[54] THROTTLE ACTUATOR IN AUTOMATIC SHIFT MECHANISM OF GEARED TRANSMISSIONS

[75] Inventor: Shunichi Kawai, Nagoya, Japan

[73] Assignee: Aisin Seiki Kabushiki Kaisha, Kariya, Japan

[21] Appl. No.: 134,158

[22] Filed: Dec. 17, 1987

[30] Foreign Application Priority Data

Dec. 18, 1986 [JP] Japan ................................. 61-300156

[51] Int. Cl.$^4$ ............................................. F02D 41/14
[52] U.S. Cl. .................................. 123/360; 74/781 R; 74/740; 74/477
[58] Field of Search ................. 123/360; 180/108, 176; 74/781 R, 740, 477, 864, 782, 783, 339

[56] References Cited

U.S. PATENT DOCUMENTS

| | | | |
|---|---|---|---|
| 2,548,761 | 4/1951 | Armantrout | 74/781 R |
| 2,946,240 | 7/1960 | Kop | 74/781 R |
| 3,477,313 | 11/1969 | Ringe | 74/781 R |
| 3,963,091 | 6/1976 | Noddings et al. | 123/360 |
| 4,033,200 | 7/1977 | Stockton | 74/740 |
| 4,082,013 | 4/1978 | Dornfeld et al. | 74/740 |
| 4,750,384 | 6/1988 | Belliveau | 74/781 R |

Primary Examiner—Raymond A. Nelli

Attorney, Agent, or Firm—Burns, Doane, Swecker & Mathis

[57] ABSTRACT

A throttle actuator in an automatic shift mechanism of a geared transmission for shifting to overdrive automatically includes first and second displacement members capable of being displaced relative to each other, the first displacement member being connected to the accelerator pedal and the second displacement member being connected to the engine throttle, a spring interposed between the first and second displacement members for displacing them in unison, actuating means attached to the second displacement member for displacing it relative to the first displacement member for displacing it relative to the first displacement member to open or close the engine throttle, and a CPU for controlling operation of the first actuating means. When a shift is made to overdrive, the CPU causes the actuating means to displace the second displacement member relative to the first displacement member, thereby opening or closing the engine throttle independently of operation of the accelerator pedal to control the rotational speed of the engine, whereby it is possible to engage or disengage the synchros in the transmission and to shift to overdrive automatically while the accelerator pedal remains depressed.

25 Claims, 6 Drawing Sheets

THROTTLE ACTUATOR IN AUTOMATIC SHIFT MECHANISM OF GEARED TRANSMISSIONS

BACKGROUND OF THE INVENTION

This invention relates to throttle actuator in a shift mechanism of a geared transmission capable of shifting to overdrive automatically.

Geared manual transmissions have long come equipped with an overdrive shift mechanism. In a transmission with five forward speeds, for example, fifth speed is overdrive. Overdrive enables fuel consumption to be improved by making the shift ratio less than one at high traveling speeds.

In a manual transmission, however, the state of the art is such that overdrive involves a complicated shifting operation and therefore is used only infrequently. Though use of overdrive in, say, a long distance truck can result in a considerable fuel savings, overdrive is not utilized very often for the abovementioned reason. In order to foster the use of overdrive, a geared transmission in which only the shift to overdrive is automated has been developed, as set forth in the specification of U.S. Pat. No. 2,548,761, and automatic shifting mechanisms of the kind described in the specifications of Japanese Patent Kokai Publication No. 60-205051 and Japanese Utilitiy Model Kokai Publication No. 60-34928 have been developed.

SUMMARY OF THE DISCLOSURE

These conventional mechanisms for automatically shifting overdrive possess certain shortcomings. Specifically, in the former of these transmissions described in the U.S. patent specification, an auxiliary transmission, namely an overdrive transmission, is connected to the main body of the transmission, and it is so arranged that the automatic shift to overdrive is effected in the overdrive transmission without performing an automatic shift in the transmission main body. In order to release a dog clutch (sleeve) when down-shifting from overdrive, a shift must be made to neutral by temporarily making the drive torque zero, so it is necessary to temporarily turn off the ignition circuit. Consequently, this transmission can be used only in vehicles driven a gasoline engine.

The mechanisms for automatically shifting to overdrive disclosed in the Japanese Publications merely computerize the shifting operation of the manual transmission. It is necessary to operate a clutch whenever a shift is made. When the throttle actuator fails, moreover, the speed of the vehicle can no longer be changed and it becomes impossible for the vehicle to travel.

The present invention has been devised in order to solve the aforementioned problems possessed by the conventional mechanisms for automatically shifting to overdrive in a geared manual transmission. An object of the present invention is to provide a throttle actuator through which it is possible to realize an automatic shift mechanism of a geared transmission capable of effecting a smooth shift to overdrive without turning an ignition circuit on and off and without operating a clutch whenever the automatic shift to overdrive is made.

According to the present invention, the foregoing object is attained by providing a throttle actuator in an automatic shift mechanism of a geared transmission for shifting to overdrive automatically in an automotive vehicle equipped with an accelerator pedal and an engine throttle, said throttle actuator comprising:

First and second displacement members capable of being displaced relative to each other, said first displacement member being operatively connected to the accelerator pedal and said second displacement member being operatively connected to the engine throttle;

a resilient member interposed between said first and second displacement members and having the capability of displacing said first and second displacement members in unison;

first actuating means attached to said second displacement member for displacing said second displacement member relative to said first displacement member to open and close the engine throttle; and first control means for controlling operation of said first actuating means.

In a preferred embodiment of the invention, the throttle actuator further comprises second actuating means attached to the first displacement member for displacing the first displacement member relative to the second displacement member independently of the accelerator pedal, and second control means for controlling the second actuating means.

Further preferred embodiments are summarized below:

The first and second displacement members respectively comprise first and second ends arranged to slide freely along an identical axis inside a body of the throttle actuator, the first end being operatively connected to the accelerator pedal by a wire passing through the second end, and the second end being operatively connected to the engine throttle by a wire passing through the first end. The resilient member comprises a spring interposed between the first and second ends with the wires passed through the center thereof, the spring urging the first and second ends away from each other. The first actuating means comprises a first pipe rod arranged to slide freely along an axis identical with that of the second end inside the body of the throttle actuator, the second end being arranged to slide freely inside the first pipe rod, and first pressure means provided for the first pipe rod for sliding same.

Each of the wires is provided with a stopper which engages a corresponding one of the first and second ends for stopping the first and second ends in such a manner that they do not separate from each other in excess of a fixed distance. When the first pipe rod is slid a fixed distance toward the first end, the first pipe rod engages the second end and causes the second end to slide together therewith.

A stopper is formed for limiting the distance the first pipe rod slides until it engages the second end.

The pressure means comprises a pressure chamber having therein piston means acting on the first pipe rod. The piston means comprises a piston plate fixed to the first pipe rod, and a diaphragm defining the pressure chamber.

The pressure chamber is connected to a vacuum source via a solenoid valve for being evacuated to negative pressure, thereby urging the first pipe; rod to slide the first pipe rod toward the first end.

The first pipe rod is urged away from the first end by a resilient member attached to the first pressure means.

The first control means comprises a computer. The computer operates the first actuating means to displace the second displacement member relative to the first displacement member so as to approach the same when vehicle velocity is greater than a prescribed vehicle velocity and, moreover, accelerator opening is less than a prescribed accelerator opening.

The second actuating means comprises a second pipe rod arranged to slide freely along an axis identical with that of the first end inside a body of the throttle actuator, the first end being arranged to slide freely inside the second pipe rod, and second pressure means provided for the second pipe rod for sliding the second pipe rod.

The second piston means comprises stopper means to restrict displacement of the second piston means less than the first piston means.

In a still further preferred embodiment:

said first and second displacement members respectively comprise first and second arms pivotally supported about coincident centers thereof, said first arm having a first end and a second end and said second arm having a first end and second end opposite the first and second ends of said first arm, respectively, the first end of said first arm being operatively coupled to the accelerator pedal, and the first end of said second arm being operatively connected to the engine throttle;

said resilient member comprises a spring interposed between said first and second arm for urging said first and second arms toward each other; and the first actuating means comprises first pressure means coupled to the second end of said second arm. The first pressure means pulls the second arm for rotating the second arm relative to the first arm. The second actuating means comprises second pressure means operatively coupled to a first end of a first arm opposite a second end of the first arm which is operatively coupled to the accelerator pedal. The second pressure means pulls the first arm for rotating the first arm relative to said second arm.

When the engine throttle is opened or closed by operating the accelerator pedal, the first and second displacement members connected respectively to the accelerator pedal and engine throttle are displaceed en bloc in operative association with the accelerator pedal by the resilient member interposed between the displacement members.

When a shift is made to overdrive in this geared transmission, the first control means operates the first actuating means to displace the second displacement member connected to the engine throttle relative to the first displacement member connected to the accelerator pedal, thereby opening or closing the engine throttle independently of operation of the accelerator pedal to control the rotational speed of the engine, whereby it is possible to engage or disengage the synchros in the transmission. Accordingly, it is unnecessary for the driver to remove his foot from the accelerator pedal and turn the clutch on and off whenever a shift to overdrive is made. This makes it possible to shift to overdrive automatically while the accelerator pedal remains depressed.

In the preferred embodiment of the invention mentioned above, second actuating means is attached to the first displacement member, which is connected to the accelerator pedal. Accordingly, even if the driver removes his foot from the accelerator pedal in the process of down-shifting from overdrive in this transmission, the first displacement member connected to the accelerator pedal is displaced by the second actuating means independently of the accelerator pedal, and the second displacement member connected to the engine throttle is maintained displaced as prescribed, thereby preventing a situation in which the down-shift is rendered impossible by a drop in the rotational speed of the engine.

With the throttle actuator of the present invention as described above, the engine throttle is opened or closed in operative association with the accelerator pedal when the engine throttle is opened or closed by ordinary operation of the accelerator pedal. When a shift to overdrive is made, however, the first actuating means displaces the second displacement member on the engine throttle side relative to the first displacement member on the accelerator pedal side so that the engine throttle is controlled independently of operation of the accelerator pedal. Accordingly, an advantage of the invention is that it is unnecessary for the driver to remove his foot from the accelerator pedal and turn a clutch on and off each time a shift to overdrive is made. Instead, the shift to overdrive can be performed automatically while the driver's foot remains on the accelerator pedal. Another advantage is that the driver need not temporarily turn off the ignition circuit when the shift is made.

Other features and advantages of the present invention will be apparent from the following description taken in conjunction with the accompanying drawings.

DETAILED DESCRIPTION OF THE PREFERRED EMBODIMENTS

A first embodiment of the present invention will now be described with reference to the drawings.

Figure 1:
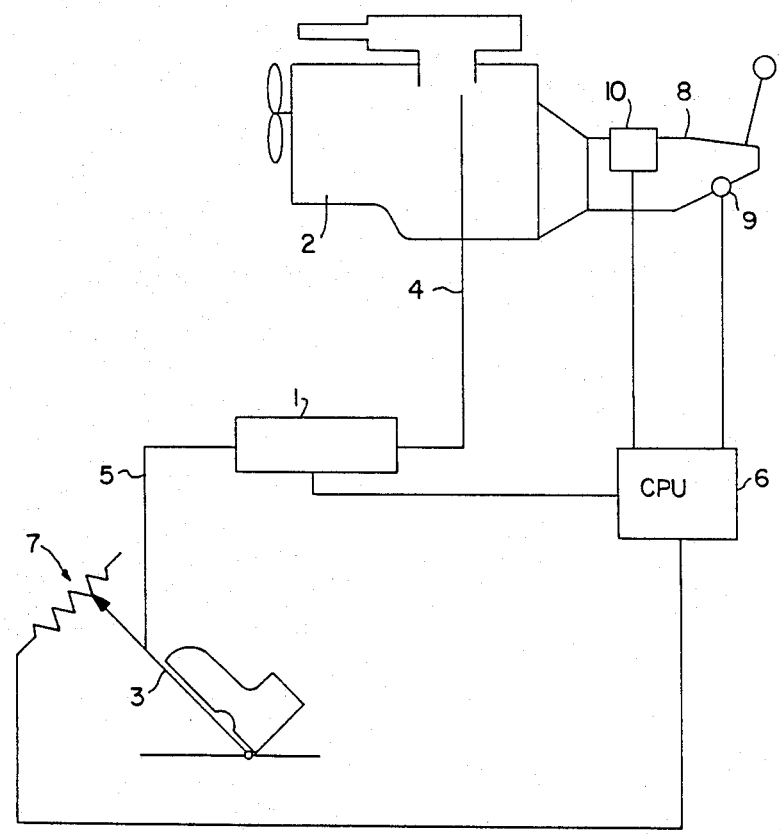
FIG. 1 is a block diagram illustrating an automatic throttle mechanism of a geared transmission in which a throttle actuator in accordance with the invention is a component.

FIG. 1 is a block diagram illustrating an automatic throttle mechanism of a geared transmission in which a throttle actuator in accordance with the invention is a component. The throttle actuator, indicated at numeral 1, is interposed between an engine 2 and an accelerator pedal 3 of the vehicle having the transmission and is coupled to the engine throttle and the accelerator pedal 3 by wires 4, 5, respectively. The throttle actuator 1 is connected to a CPU 6 serving as a control means. The latter controls the operation of the throttle actuator 1 on the basis of a signal from an accelerator opening sensor 7 and a signal from a vehicle velocity sensor 9 mounted on a transmission 8. The CPU 6 is also connected to a shift actuator 10 for controlling the operation thereof.

Figure 2:
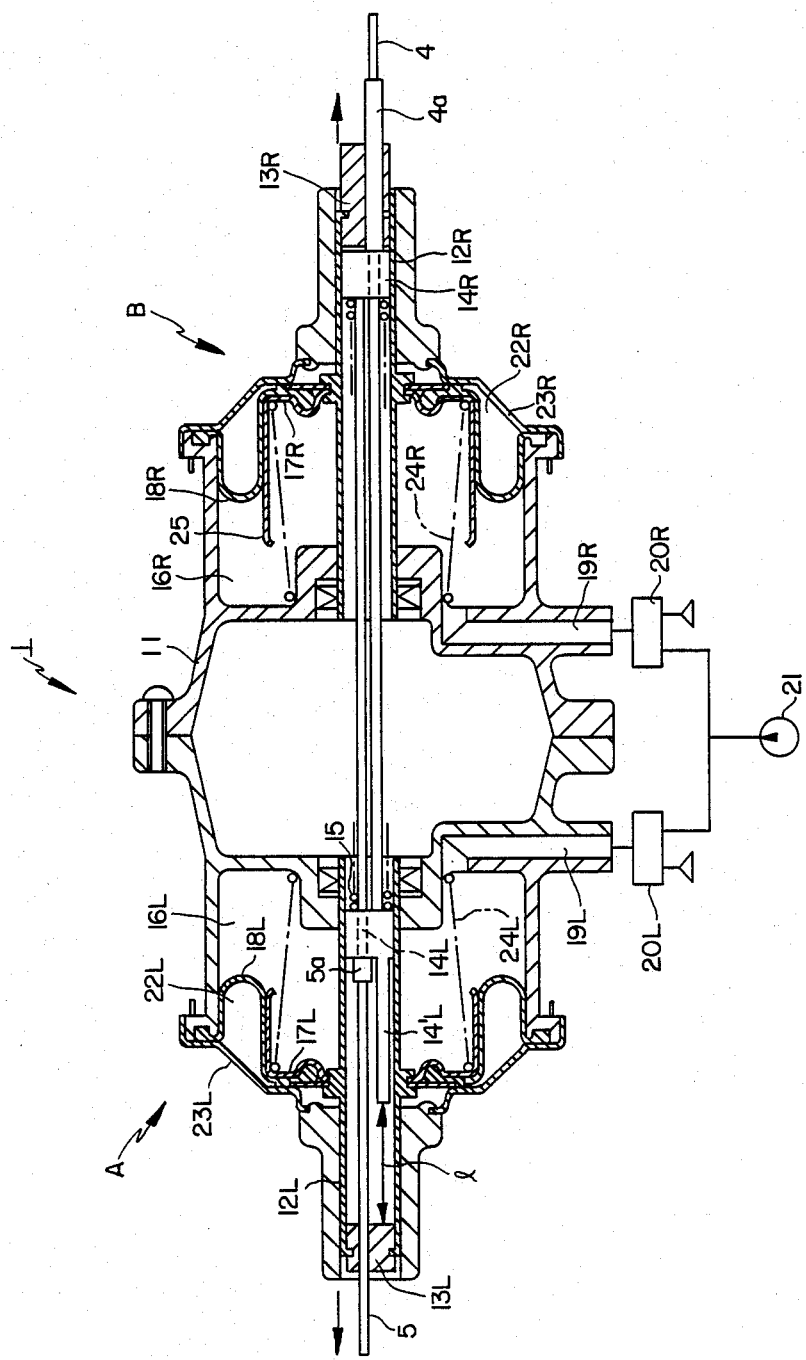
FIG. 2 is a side section illustrating an embodiment of the invention.

The throttle actuator 1 has the structure shown in FIG. 2 and includes a body 11 composed of symmetrical left and right halves. Pipe rods 12L, 12R are freely slidably fitted into the respective left and right halves of the body 11 and have outer end portions into which sleeves 13L, 13R, respectively, are fitted and fixed. An end 14L on the accelerator pedal side, which is the left side in FIG. 2, is provided on its outward end face with a longitudinally extending end stopper 14′L. When the end 14L slides toward left within the pipe rod 12L, its end stopper 14′L strikes the sleeve 13L, thereby limiting the sliding distance 1 of the end 14L.

The wire 4, one end of which is connected to the engine 2, is led into the pipe rods 12L, 12R by being passed through the sleeve 13R and end 14R. The other end of the wire 4 is fixed to the end 14L. Similarly, the wire 5, one end of which is connected to the accelerator pedal 3, is led into the pipe rods 12L, 12R by being passed through the sleeve 13L and end 14L, and the other end of the wire 5 is fixed to the end 14R. The wire 4 is fitted with a stopper 4a at a position on the outer side of end 14R. The stopper 4a, which is fitted into the sleeve 13R so as to slide freely therealong, is guided by this sleeve. The wire 5 is fitted with a stopper 5a at a position on the outer side of the end 14L.

Interposed between the ends 14L and 14R is a spring 15 through which the wires 4 and 5 pass. The spring 15 applies an urging force that biases the ends 14L, 14R away from each other, with the end 14L being brought into pressured contact with the stopper 5a of wire 5 and the end 14R being brought into pressured contact with the stopper 4a of wire 4. Thus, the wires 4 and 5 are coupled to each other so as to function as a single wire cable.

Pressure chambers 16L and 16R are formed respectively in the left and right halves of the body 11. Arranged respectively within the pressure chambers 16L, 16R are plates 17L, 17R fixed to the outer peripheral portions of the respective pipe rods 12L, 12R. Diaphragms 18L, 18R are interposed between the inner wall of the pressure chambers 16L, 16R and the plates 17L, 17R, respectively to seal off the pressure chambers and allow the pipe rods 12L, 12R to slide relative to the left and right halves of the body 11. Springs 24L, 24R are interposed between the inner wall of the body 11 and the plates 17L, 17R inside the pressure chambers 16L, 16R respectively, and bias the plates 17L, 17R longitudinally outwardly. Thus, pipe rods 12L, 12R are situated at their outermost end positions relative to the left and right halves of the body 11, respectively as shown in FIG. 2.

The pressure chambers 16L, 16R are communicated with the outside of the body 11 by air passageways 19L, 19R formed in the left and right halves of the body 11, respectively. A half-throttle solenoid valve 20R is connected to the air passageway 19R, and a low-throttle solenoid valve 20L is connected to the air passageway 19L. A vacuum pump 21 is connected to the pressure chambers 16L, 16R via the low-throttle solenoid valves 20L or half-throttle solenoid valve 20R. These solenoid valves 20L, 20R are connected to the CPU6 and are opened and closed under the control thereof.

Chambers 22L, 22R defined within the pressure chambers 16L, 16R by the diaphragms 18L, 18R, respectively, are communicated with the atmosphere by holes 23L, 23R.

Thus, the throttle actuator 1 has a structure whose left and right halves are symmetrical. The left side of the structure in FIG. 2 constitutes a low-throttle actuator A, and the right side of the structure in FIG. 2 constitutes a half-throttle actuator B.

Figure 3:
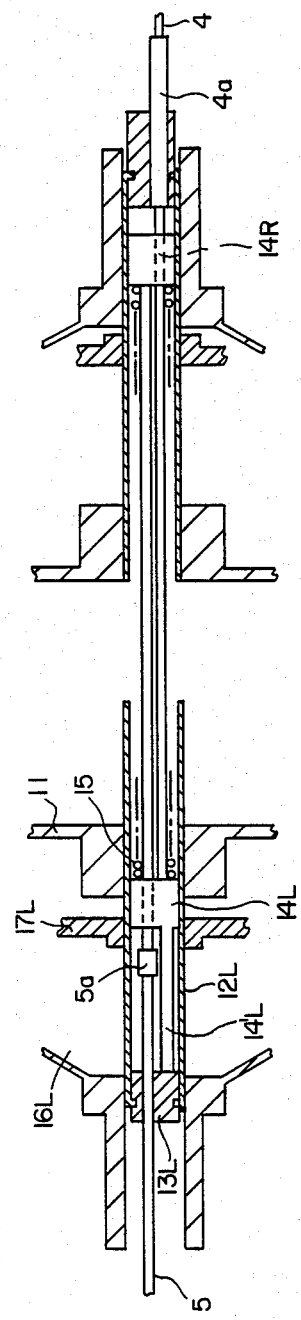
FIG. 3 is an operational view illustrating operation of the above embodiment at the time of an up-shift.
Figure 4:
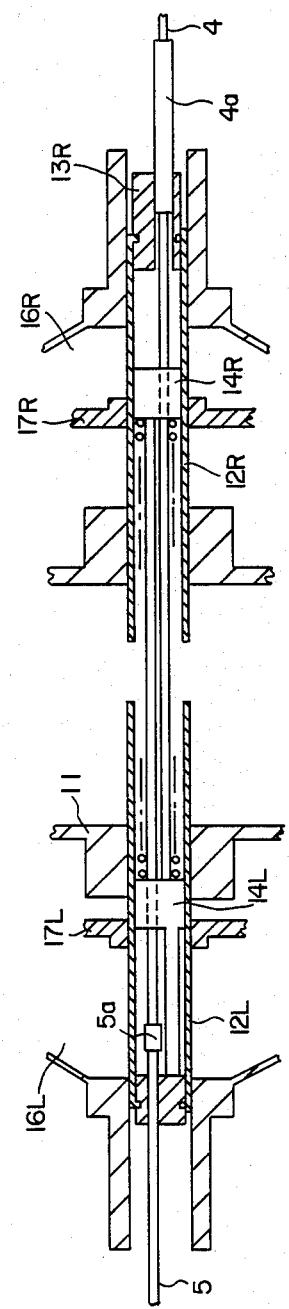
FIG. 4 is an operational view illustrating operation of the above embodiment at the time of a down-shift.

The operation of the throttle actuator 1 will now be described in connection with a transmission having five forward speeds. Reference will be had to FIGS. 3 and 4.

When the vehicle equipped with the transmission is traveling at a constant velocity, the low-throttle solenoid valve 20L and the half-throttle solenoid valve 20R are both open, so that the pressure chambers 16L, 16R are communicating with the atmosphere. At this time the end 14L is in pressured engagement with the stopper 5a, the end 14R is in pressured engagement with the stopper 4a owing to the action of the spring 15. If the accelerator pedal 3 is depressed or released under these conditions, the wires 4 and 5 are pulled as one unit to open or close the engine throttle.

Next, if the accelerator pedal 3 is depressed to increase the vehicle velocity, the vehicle velocity sensor 9 and the accelerator opening sensor 7 produce the corresponding output signals, which are inputted to the CPU 6. If, on the basis of these input signals, the CPU 6 determines that vehicle velocity V is above a predetermined vehicle velocity $V_1$ and, moreover, that accelerator opening $\theta$ is below a predetermined opening $\theta_1$, so that this is an appropriate moment for a shift to fifth speed (overdrive), the CPU 6 turnes on the low-throttle solenoid valve 20L to communicates the pressure chamber 16L on the side of the low-throttle actuator A to the vacuum pump 21. When the air in the pressure chamber 16L is drawn out by the vacuum pump 21 to produce negative pressure within the pressure chamber 16L, the plate 17L is urged toward the center of the body 11, as shown in FIG. 3, thereby being slid rightward in FIG. 3 accompanied by the pipe rod 12L to which it is secured.

As a result, the sleeve 13L is brought into pressing contact with the end stopper 14′L of end 14L, so that the end 14L is slid rightward in the Figure against the force of spring 15. Consequently, despite the fact that the wire 5 is pulled leftward in the Figure by depression of the accelerator pedal 3, the wire 4 is released to close the throttle, whereby the rotational speed of the engine is reduced.

If, when the rotational speed of the engine is thus reduced automatically by the throttle actuator 1 and, as a result, the torque transmission to the transmission 8 diminishes, a shift is made from fouth speed to neutral by the shift actuator 10 in response to a command from the CPU 6 and this is followed by pressing a synchro against the fifth speed gear, then the synchro will engage the fifth speed gear, thereby effecting an up-shift to fifth speed (overdrive), at the moment the rotational speed of the engine decreases any further.

If the low-throttle solenoid valve 20L is turned off again in response to a command from the CPU 6 after completion of the shift to overdrive is sensed, then the pressure chamber 16L is communicated with the atmosphere, the plate 17L is urged leftward in the Figure by the spring 24L and, as a result, is slid leftward together with the pipe rod 12L to be restored to its original position. This causes the ends 14L, 14R to come into pressured engagement with the stoppers 5a, 4a, respectively, thereby placing the throttle actuator 1 in the inoperative state so that the engine throttle can be opened or closed in response to depression or release of the accelerator pedal 3.

Next, if the vehicle, which is traveling in fifth speed (overdrive), decelerates to such an extent that the vehicle velocity V drops below a predetermined vehicle velocity $V_2$ and, moreover, that accelerator opening $\theta$ rises above a predetermined opening $\theta_2$, then, in accordance with the output signals from the vehicle velocity sensor 9 and accelerator opening sensor 7, the CPU 6 will turn on the low-throttle solenoid valve 20L of the throttle actuator 1 to communicate the pressure chamber 16L with the vacuum pump 21 and, at the same time, will turn to half-throttle solenoid valve 20R to communicate the pressure chamber 16R with the vacuum pump 21.

Owing to this communication between the pressure chamber 16L and vacuum pump 21, the plate 17L, pipe rod 12L and 14L on the side of the low-throttle actuator A are slid rightward, as shown in FIG. 4, so that the wire 4 is released and the engine throttle opening reduced irrespecitive of depression of the accelerator pedal 3, just as in the case of the up-shift described above. When the rotational speed of the engine decreases and the torque transmitted to the transmission diminishes, a shift is made from fifth speed to neutral by the shift actuator 10 in response to a command from the CPU 6, and the synchro is pressed against the fourth speed gear. When the shift into neutral is sensed, the CPU 6 turns off the low-throttle solenoid valve 20L to communicate the pressure chamber 16L with the atmosphere, whereby the plate 17L, pipe rod 12L and end 14L are slid leftward in the Figure by the urging force of the spring 24L, thereby opening the throttle. As a result, the synchro is applied to fourth speed, thereby effecting a down-shift to fourth speed, at the moment the rotational speed of the engine rises by an amount corresponding to the gear ratio of fourth speed.

If the driver should remove his foot from the accelerator pedal 3 after the shift from fifth speed to neutral, performed by the throttle actuator 1 as described above, but before fourth speed is established, the end 14L will not be capable of returning to a throttle position necessary for bringing the synchro into action in fourth speed and, hence, a shift to fourth speed can no longer be made, even though the low-throttle solenoid valve 20L is turned off to restore the pipe rod 12L to its original position. To prevent this phenomenon from occurring, the half-throttle solenoid valve 20R is turned on at the same time as the low-throttle solenoid valve 20L when the down-shift is made, so that the interior of the pressure chamber 16R is evacuated to negative pressure by the vacuum pump 21, whereby the plate 17R and pipe rod 12R are slid leftward in the drawing, just as in the case of the low-throttle actuator A described above.

Accordingly, as will be understood from FIG. 4, the sleeve 13R is situated closer to the center of the body 11 than when the half-throttle actuator B was inoperative. Therefore, even if the driver releases the accelerator pedal 3 during a down-shift, the end 14R engages the sleeve 13R and the throttle maintains an opening necessary for a shift to fourth speed. When the down-shift to fourth speed is sensed, the CPU 6 turns off the half-throttle solenoid valve 20R to return the pipe rod 12R to its original position, whereby the down-shift to fourth speed is completed.

It should be noted that the half-throttle actuator B is set to restrict the throttle opening θ, for instance, to 2/4 by the operation thereof. This is adjusted by limiting the sliding distance of the pipe rod 12R by the arm length of a hold plate 25 formed on the plate 17R.

Thus, the throttle actuator 1 makes it possible to automatically shift to overdrive without operating a clutch.

In the first embodiment of the invention described above, the ends 14L, 14R constitute a pair of displacement members, the spring 15 constitutes a resilient member 15, the pipe rod 12L, sleeve 13L, pressure chamber 16L, plate 17L, diaphragm 18L, and spring 24L constitute actuating means actuatable by the vacuum pump 21, and the CPU 6 and low-throttle solenoid valve 20L constitute first control means.

Figure 5:
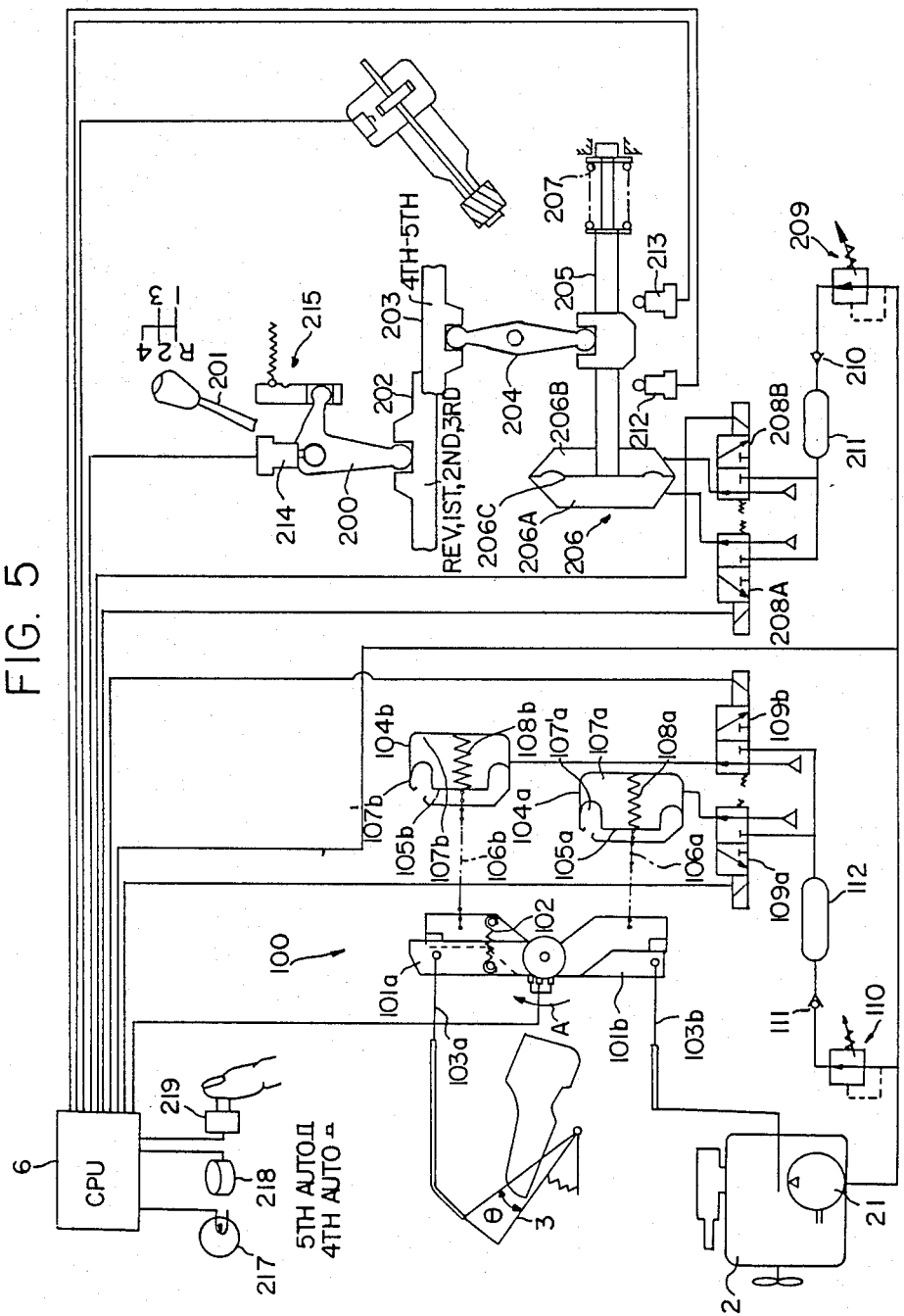
FIG. 5 is a block diagram illustrating an automatic shift mechanism including a throttle actuator in accordance with a second embodiment of the invention.

FIG. 5 is a block diagram illustrating an arrangement in which a second embodiment of a throttle actuator according to the invention is incorporated in an automatic shift mechanism of a geared transmission. The throttle actuator, here designated at numeral 100, includes a spring 102 interposed between two arms 101a, 101b pivotally supported at their respective centers. The accelerator pedal 3 is coupled to one end of one arm 101a by a wire 103a, and the end of the other arm 101b on the side opposite the abovementioned end of the arm 101a is coupled to the throttle of the engine 2 by wire 103b. In ordinary operation of the accelerator, the arms 101a, 101b are swung in unison by the spring 102 in response to depression of the accelerator pedal 3, whereby the throttle is opened or closed.

A piston plate 105a, which is mounted in a case 104a by a diaphragm so as to be capable of moving freely, is coupled by a chain 106a to the end of the arm 101a opposite the wire 103a. The interior of the case 104a is partitioned into a pressure chamber 107a and a chamber 107'a by the piston plate 105a and the diaphragm.

A spring 108a is interposed between the piston plate 105a and the inner wall of the case 104a within the pressure chamber 107a, and the chamber 107'a is in communication with the atmosphere.

As in the case of the arm 101a, a piston plate 105b which, together with a diaphragm, partitions the interior of a case 104b into a pressure chamber 107b and a chamber 107'b, is coupled by a chain 106b to the end of arm 101b opposite the wire 103b, and a spring 108b is loaded in the pressure chamber 107b.

The pressure chambers 107a, 107b are connected to the vacuum pump 21 by solenoid valves 109a, 109b, respectively. The solenoid valves 109a, 109b are adapted to communicate the pressure chambers 107a, 107b with the vacuum pump 21 or the atmosphere in a switching manner. Operation of these solenoid valves is controlled by the CPU 6.

Connected between the solenoid valves 109a, 109b and the vacuum pump 21 are a pressure regulating valve 110, a check valve 111 and a vacuum tank 112.

Numeral 200 denotes a manual shift arm so adapted that a fork shaft 202 is operated by manipulation of a shift lever 201 to enable a shift to reverse and to first through third forward speeds. The structure is similar to that of the prior art. A fork shaft 203 for fourth and fifth speeds is coupled to a shift rod 205 by a lever 204 pivotally supported at its central portion, with the arrangement being such that a shift is effected between fourth and fifth speeds by rocking the lever 204.

An actuator 206 having pressure chamber 206A, 206B defined by a diaphragm 206C fixed to a rod 205 is attached to one end of the shift rod 205. A neutral return spring 207 for holding the shift rod at the neutral position is attached to the other end of the shift rod 205.

The pressure chambers 206A, 206B of the actuator 206 are connected to the vacuum pump 21 via a fourth-speed solenoid valve 208A and fifth-speed solenoid valve 208B, respectively. The solenoid valves 208A, 208B, the operation whereof is controlled by the CPU 6, are adapted to communicate the pressure chambers 206A, 206B with the vacuum pump 21 or the atmosphere in a switching manner. Connected between the solenoid valves 208A, 208B and the vacuum pump 21 are a pressure regulating valve 209 a check valve 210 and a vacuum tank 211.

The shift rod 205 is provided with a fourth-speed switch 212 and a fifth-speed switch 213 for detecting when the shift rod 205 is slid to the fourth-speed position or fifth-speed position by operation of the actuator 206, and for supplying the CPU 6 with signals indicative of which of these positions the shift rod 205 occupies.

A fourth-speed select switch 214 inputs a fourth-speed shift signal to the CPU 6 when the shift lever 201 is shifted to the fourth-speed position. Numeral 215 denotes a feeling unit which function when a shift is made to the fourth-speed position. Numeral 216 denotes a velocity sensor mounted on the transmission, 217 a fifth-speed indicator lamp, 218 gear-shift chime, and 219 a mode switch.

Figure 6:
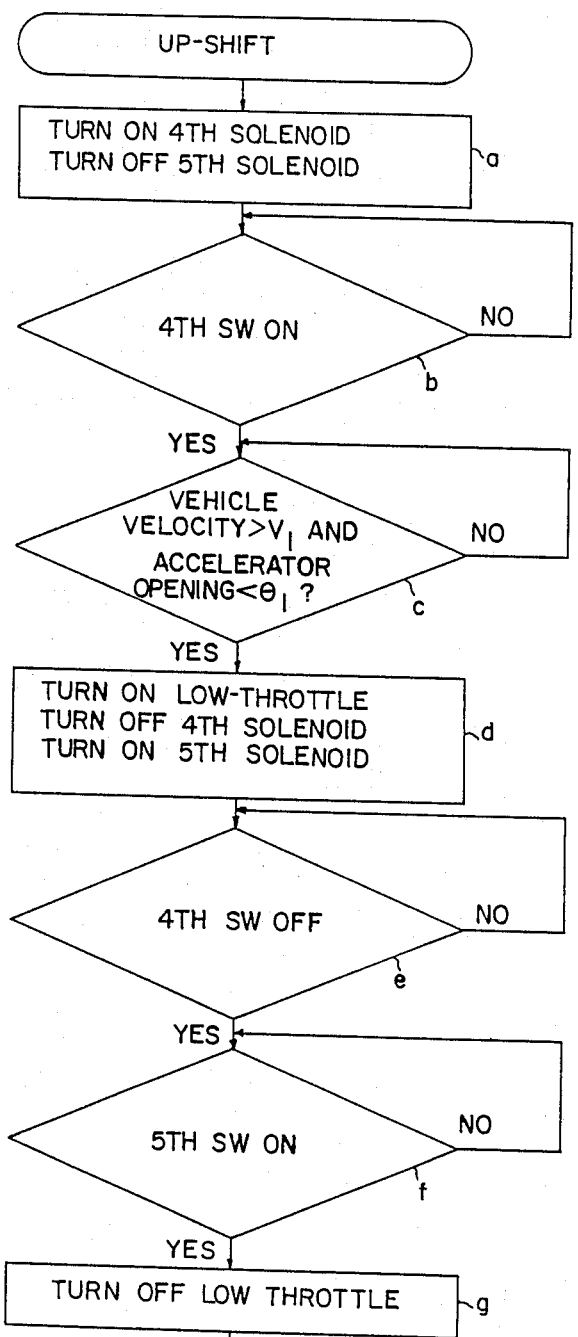
FIG. 6 is a flowchart illustrating operation of the second embodiment at the time of an up-shift.
Figure 7:
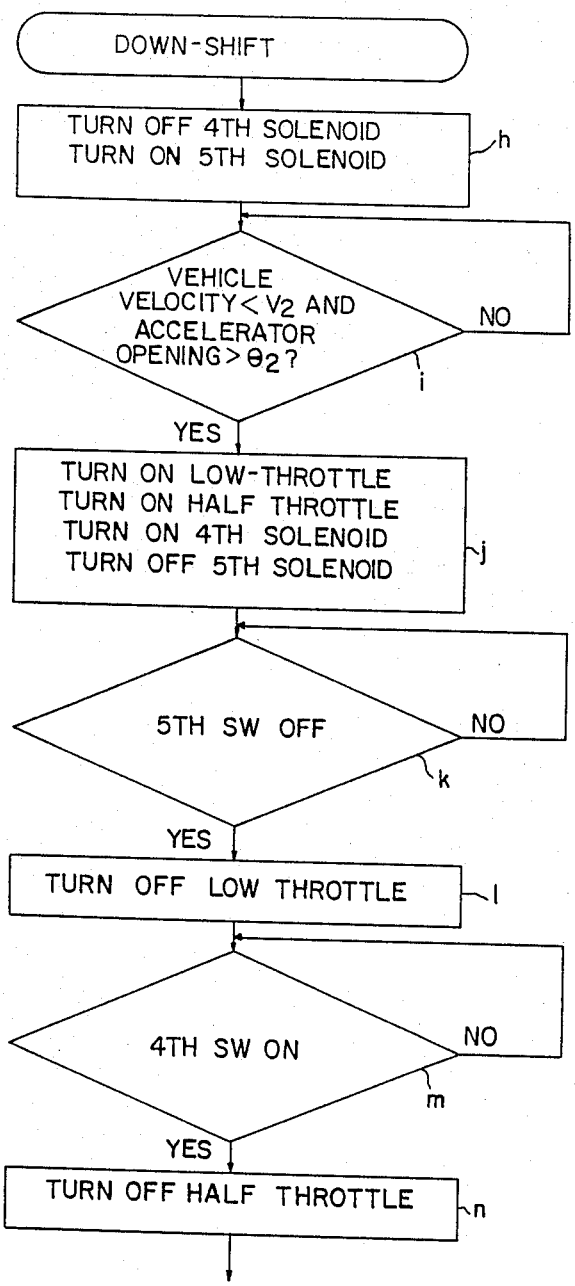
FIG. 7 is a flowchart illustrating operation of the second embodiment at the time of a down-shift.

The operation of this automatic shift mechanism will now be described based on the flowcharts of FIGS. 6 and 7.

When the shift lever 201 is placed in the fourth-speed shift position, the fourth-speed lever switch 214 is turned on and produces a signal on the basis of which the CPU 6 turns on the fourth-speed geared 208A (step a) to communicate the pressure chamber 206A of actuator 206 with the vacuum pump 21, thereby bringing the pressure chamber to negative pressure. In response, the shift rod 205 is slid to the left in FIG. 5, so that the fork shaft 203 is moved to the fourth-speed side via the lever 204, whereby an up-shift to fourth speed is made. This up-shift to fourth speed is sensed by the CPU 6. This is accomplished by a signal which the fourth-speed switch 212 inputs to the CPU 6 upon sensing the sliding of the shift rod 205 to the fourth-speed side (step b).

When the vehicle accelerates while traveling in fourth speed and surpasses the prescribed velocity $V_1$ and, moreover, the accelerator opening $\theta$ falls below a prescribed opening $\theta_1$ (step c), the CPU issues a command in response to which the solenoid valve (low-throttle solenoid valve) 109b is turned on, the foruth-speed solenoid valve 208A is turned off and the fifth-speed solenoid valve 208B is turned on (step d), as in the first embodiment described above.

In response to turn-on of the solenoid valve 109b, the pressure chamber 107b is evacuated to negative pressure by being communicated with the vacuum pump 21, so that the chain 106b is pulled to rotate the arm 101b in the direction of arrow A in FIG. 5, thereby reducing the throttle opening of the engine 2.

In response to turn-on of the fifth-speed solenoid valve 208B, the pressure chamber 206B of actuator 206 is now brought to negative pressure by being communicated with the vacuum pump 21, so that the shift rod 205 is urged rightward in FIG. 5. At the moment the rotational speed of the engine 2 drops due to the reduced throttle opening, the fork shaft 203 slips from fourth speed to neutral, the shift rod 205 is slid to the neutral position shown in FIG. 5, and the synchro is pressed against the fifth-speed gear. At the moment the engine rotational speed undergoes a further decline, the synchro acts in fifth speed, as a result of which the shift rod 205 slides further to the right in FIG. 5 to be situated at the fifth-speed position.

The shift from fourth speed to neutral and the shift from neutral to fifth speed are sensed by the CPU 6, since the fourth-speed switch 212 turns off (step e) and the fifth-speed switch 213 turns on (step f). The solenoid valve 109b is turned off thereafter (step g), thereby completing the automatic up-shift to fifth speed (overdrive).

Next, when the fifth-speed solenoid valve 208B is turned on, the vehicle is decelerated from the overdrive traveling state (step h), the vehicle velocity V drops below a prescribed velocity $V_2$ and, moreover, the acceleration opening $\theta$ exceeds the prescribed opening $\theta_2$ (step i), the CPU 6 issues commands to turn on both the solenoid valves 109a, 109b, turn on the fourth-speed solenoid valve 208A and turn off the fifth-speed solenoid valve 208B (step j).

As in the case of the up-shift described above, the throttle opening is reduced by the rotation of the arm 101b in response to turn-on of the solenoid valve (low-throttle solenoid valve) 109b. Then, with the rotational speed of the engine having been reduced, the fourth-speed solenoid valve 208A is turned on to establish negative pressure in the pressure chamber 206A and, hence, urge the shift rod 205 leftward in FIG. 5. As a result, the shift slips from fifth speed to neutral and the synchro is pressed against the fourth-speed gear.

The fifth-speed switch 213 is turned off (step k) by sliding of the shift rod 205, in response to which the CPU 6 turns off the solenoid valve 109b (step l) to open the throttle. When the engine rotational speed rises, the synchro comes into play in fourth speed to effect the down-shift to fourth speed. This down-shift to fourth speed is sensed by the fourth-speed switch 202, which turns on (step m). The CPU 6 thereafter turns off the solenoid valve (half-throttle solenoid valve) 109a (step n) to complete the down-shift.

If the driver removes his foot from the accelerator pedal 3 in the process of shifting down to fourth speed, the solenoid valve (half-throttle solenoid valve) 109a is turned on, thereby establishing negative pressure in the pressure chamber 107a and rotating the arm 101a in the direction opposite that of arrow A in FIG. 5. As a result, the accelerator opening is maintained at the prescribed opening necessary for the fourth-speed shift, so that an inability to shift to fourth speed is prevented.

In the first and second embodiments of the invention set forth above, it is described that the throttle actuator and shift actuator are operated by controlling air pressure. However, it is also possible to operate these actuators by controlling hydraulic pressure or else.

Further, the foregoing embodiments relate to a case where the invention is applied to a transmission having five forward speeds. However, it goes without saying that the throttle actuator of the present invention can also be connected to transmissions equipped with overdrive having a different set of speeds.

As many apparently widely different embodiments of the present invention can be made without departing from the spirit and scope thereof, it is to be understood that the invention is not limited to the specific embodiments thereof except as defined in the appended claims.

WHAT IS CLAIMED IS:

1. A throttle actuator in an automatic shift mechanism of a geared transmission for shifting to overdrive automatically in an automotive vehicle equipped with an accelerator pedal and an engine throttle, said throttle actuator comprising:
   first and second displacement members capable of being displaced relative to each other, said first displacement member being operatively connected to the accelerator pedal and said second displacement member being operatively connected to the engine throttle;

a resilient member interposed between said first and second displacement members and having the capability of displacing said first and second displacement members in unison;

first actuating means attached to said second displacement member for displacing said second displacement member relative to said first displacement member to open and close the engine throttle; and first control means for controlling operation of said first actuating means.

2. The throttle actuator according to claim 1, further comprising:

second actuating means attached to said first displacement member for displacing said first displacement member relative to said second displacement member independently of the accelerator pedal; and second control means for controlling said second actuating means.

3. The throttle actuator according to claim 1, wherein:

said first and second displacement members respectively comprise first and second ends arranged to slide freely along an identical axis inside a body of the throttle actuator, said first end being operatively connected to the accelerator pedal by a wire passing through said second end, and said second end being connected to the engine throttle by a wire passing through said first end;

said resilient member comprises a spring interposed between said first and second ends with said wires passed through the center thereof, said spring urging said first and second ends away from each other; and said first actuating means comprises:

a first pipe rod arranged to slide freely along an axis identical with that of said second end inside the body of the throttle actuator, said second end being arranged to slide freely inside said first pipe rod; and first pressure means provided for said first pipe rod for sliding said first pipe rod.

4. The throttle actuator according to claim 3, wherein each of said wires is provided with a stopper which engages a corresponding one of said first and second ends for stopping said first and second ends in such a manner that said first and second ends do not separate from each other in excess of a fixed distance.

5. The throttle actuator according to claim 3, wherein when said first pipe rod is slid a fixed distance toward said first end, said first pipe rod engages said second end and causes said second end to slide together therewith.

6. The throttle actuator according to claim 5, wherein a stopper is formed for limiting the distance said first pipe rod slides until it engages said second end.

7. The throttle actuator according to claim 3, wherein said first pressure means comprises a pressure chamber having therein piston means acting on said first pipe rod.

8. The throttle actuator according to claim 7, wherein said piston means comprises a piston plate fixed to said first pipe rod, and a diaphragm defining the pressure chamber.

9. The throttle actuator according to claim 7, wherein said pressure chamber is connected to a vacuum source via a solenoid valve for being evacuated to negative pressure, thereby urging said first pipe rod to slide said first pipe rod toward said first end.

10. The throttle actuator according to claim 3, wherein said first pipe rod is urged away from said first end by a resilient member attached to said pressure means.

11. The throttle actuator according to claim 1, wherein said first control means comprises a computer, said computer operating said first actuating means to displace said second displacement member relative to said first displacement member so as to approach the same when vehicle velocity is greater than a prescribed vehicle velocity and, moreover, accelerator opening is less than a prescribed accelerator opening.

12. The throttle actuator according to claim 2, wherein said second actuating means comprises:

a second pipe rod arranged to slide freely along an axis identical with that of said first end inside a body of the throttle actuator, said first end being arranged to slide freely inside said second pipe rod; and second pressure means provided for said second pipe rod for sliding said second pipe rod.

13. The throttle actuator according to claim 12, wherein when said second pipe rod is slid a fixed distance toward a second end being connected to the engine throttle by a wire passing through said first end, said second pipe rod engages a first end and causes said first end to slide together therewith.

14. The throttle actuator according to claim 11, wherein said second pressure means comprises a pressure chamber having therein first piston means acting on said second pipe rod, and a diaphragm.

15. The throttle actuator according to claim 14, wherein said piston means comprises a piston plate fixed to said second pipe rod, and a diaphragm defining the pressure chamber.

16. The throttle actuator according to claim 14, wherein said pressure chamber is connected to a vacuum source via a solenoid valve for being evacuated to negative pressure, thereby urging said second pipe rod to slide said second pipe rod toward said second end.

17. The throttle actuator according to claim 12, wherein said second pipe rod is urged away from said second end by a resilient member attached to said pressure means.

18. The throttle actuator according to claim 2, wherein said second control means comprises a computer, said computer operating said second actuating means to displace said first displacement member relative to said second displacement member so as to approach the same when vehicle velocity is less than a prescribed vehicle velocity and, moreover, accelerator opening is greater than a prescribed accelerator opening.

19. The throttle actuator according to claim 15, wherein said second piston means comprises stopper means to restrict displacement of the second piston means less than the first piston means.

20. The throttle actuator according to claim 1, wherein:

said first and second displacement members respectively comprise first and second arms pivotally supported about coincident centers thereof, said first arm having a first end and a second end and said second arm having a first end and second end opposite the first and second ends of said first arm, respectively, the first end of said first arm being operatively coupled to the accelerator pedal, and the first end of said second arm being operatively connected to the engine throttle;

said resilient member comprises a spring interposed between said first and second arm for urging said first and second arms toward each other; and said first actuating means comprises first pressure means coupled to the second end of said second arm.

21. The throttle actuator according to claim 20, wherein the first pressure means comprises piston means to define a pressure chamber, the piston means being connected to the second end of said second arm.

22. The throttle actuator according to claim 21, wherein said pressure chamber is connected to a vacuum source via a solenoid valve for being evacuated to negative pressure, thereby pulling said second arm for rotating said second arm relative to said first arm.

23. The throttle actuator according to claim 20, wherein said second actuating means comprises second pressure means operatively coupled to a first end of a first arm opposite a second end of said first arm which is operatively coupled to the accelerator pedal.

24. The throttle actuator according to claim 23, wherein the second pressure means comprises piston means to define a pressure chamber, this piston means being connected to the first end of said first arm.

25. The throttle actuator according to claim 24, wherein said pressure chamber is connected to a vacuum source via a solenoid valve for being evacuated to negative pressure, thereby pulling said first arm for rotating said first arm relative to said second arm.

* * * * *